United States Patent
Shimazaki et al.

(10) Patent No.: US 8,543,988 B2
(45) Date of Patent: Sep. 24, 2013

(54) TRACE PROCESSING PROGRAM, METHOD AND SYSTEM

(75) Inventors: Kenichi Shimazaki, Kawasaki (JP); Koji Ishibashi, Kawasaki (JP); Seiya Shindo, Kawasaki (JP); Shinji Watanabe, Kawasaki (JP); Koutaro Tsuro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1723 days.

(21) Appl. No.: 10/955,887

(22) Filed: Sep. 30, 2004

(65) Prior Publication Data

US 2006/0015612 A1    Jan. 19, 2006

(30) Foreign Application Priority Data

Jun. 3, 2004    (JP) ................. 2004-165319

(51) Int. Cl.
*G06F 9/44* (2006.01)
*G06F 15/16* (2006.01)

(52) U.S. Cl.
USPC ............................. 717/128; 709/203; 717/125

(58) Field of Classification Search
USPC .......................................................... 717/128
See application file for complete search history.

(56) References Cited

U.S. PATENT DOCUMENTS

| | | | | |
|---|---|---|---|---|
| 5,327,568 A * | 7/1994 | Maejima et al. | ............... | 717/147 |
| 5,896,536 A * | 4/1999 | Lindsey | ............... | 717/128 |
| 5,903,559 A * | 5/1999 | Acharya et al. | ............... | 370/355 |
| 5,960,199 A * | 9/1999 | Brodsky et al. | ............... | 717/128 |
| 6,145,121 A * | 11/2000 | Levy et al. | ............... | 717/135 |
| 6,189,141 B1 * | 2/2001 | Benitez et al. | ............... | 717/153 |
| 6,330,692 B1 * | 12/2001 | Kamuro et al. | ............... | 714/38 |
| 6,338,159 B1 * | 1/2002 | Alexander et al. | ............... | 717/128 |
| 6,480,886 B1 * | 11/2002 | Paice | ............... | 709/208 |
| 6,678,883 B1 * | 1/2004 | Berry et al. | ............... | 717/128 |
| 6,728,949 B1 * | 4/2004 | Bryant et al. | ............... | 717/127 |

(Continued)

FOREIGN PATENT DOCUMENTS

JP    1-277940    11/1989
JP    4-84234    3/1992

(Continued)

OTHER PUBLICATIONS

Marcos K. Aguilera, Performamance Debuggin for Distributed Systems of Black Boxes, Oct. 2003, ACM, SOSP '03, p. 85, graphs 2 & 16.*

(Continued)

*Primary Examiner* — Tuan Q. Dam
*Assistant Examiner* — Zheng Wei
(74) *Attorney, Agent, or Firm* — Greer, Burns & Crain, Ltd.

(57) ABSTRACT

A distributed application system has a plurality of applications running on a plurality of servers arranged hierarchically and, when receiving a request telegraphic message from a client, executes processes while transferring a relay code between applications in order. A trace condition embedding unit embeds a trace collection condition into a relay code and transfers it to the next application. Trace collection units decide whether trace collection is to be made or not, and perform a process. The trace collection condition includes an indication of a range of tracing for each application and a record of applications which has passed through. The trace condition embedding unit further includes intermittent switch information which indicates a ratio of trace collection to reception times of the request telegraphic message.

9 Claims, 17 Drawing Sheets

(56) References Cited

U.S. PATENT DOCUMENTS

| | | | |
|---|---|---|---|
| 6,728,955 B1* | 4/2004 | Berry et al. | 717/158 |
| 6,751,619 B1* | 6/2004 | Rowstron et al. | 707/10 |
| 6,925,431 B1* | 8/2005 | Papaefstathiou | 703/17 |
| 7,047,521 B2* | 5/2006 | Bunnell | 717/130 |
| 7,058,927 B2* | 6/2006 | Yenne et al. | 717/128 |
| 7,194,664 B1* | 3/2007 | Fung et al. | 714/45 |
| 7,231,636 B1* | 6/2007 | Evans | 717/127 |
| 7,284,238 B2* | 10/2007 | Inagaki et al. | 717/128 |
| 7,380,239 B1* | 5/2008 | Srivastava et al. | 717/128 |
| 7,475,386 B1* | 1/2009 | Shapiro et al. | 717/128 |
| 7,721,266 B2* | 5/2010 | Frey et al. | 717/128 |
| 7,802,235 B2* | 9/2010 | Langkafel et al. | 717/128 |
| 2002/0087949 A1* | 7/2002 | Golender et al. | 717/124 |
| 2002/0138788 A1* | 9/2002 | Yenne et al. | 714/38 |
| 2002/0194393 A1* | 12/2002 | Hrischuk et al. | 709/318 |
| 2003/0088854 A1* | 5/2003 | Wygodny et al. | 717/130 |
| 2003/0140282 A1* | 7/2003 | Kaler et al. | 714/39 |
| 2004/0123274 A1* | 6/2004 | Inagaki et al. | 717/128 |
| 2004/0230956 A1* | 11/2004 | Cirne et al. | 717/128 |
| 2005/0091645 A1* | 4/2005 | Chilimbi et al. | 717/130 |
| 2008/0148239 A1* | 6/2008 | Petrov et al. | 717/128 |

FOREIGN PATENT DOCUMENTS

| | | |
|---|---|---|
| JP | 05-241890 | 9/1993 |
| JP | 2000-330822 | 11/2000 |
| JP | 2001-142737 | 5/2001 |
| JP | 2001-318809 | 11/2001 |

OTHER PUBLICATIONS

Ratul Mahajan, User-level internet path diagnosis, Oct. 2003, ACM, SOSP '03.*

Application Response Measurement (ARM); Issue 4.0—Java Binding; pp. 1-84; 2003.

* cited by examiner

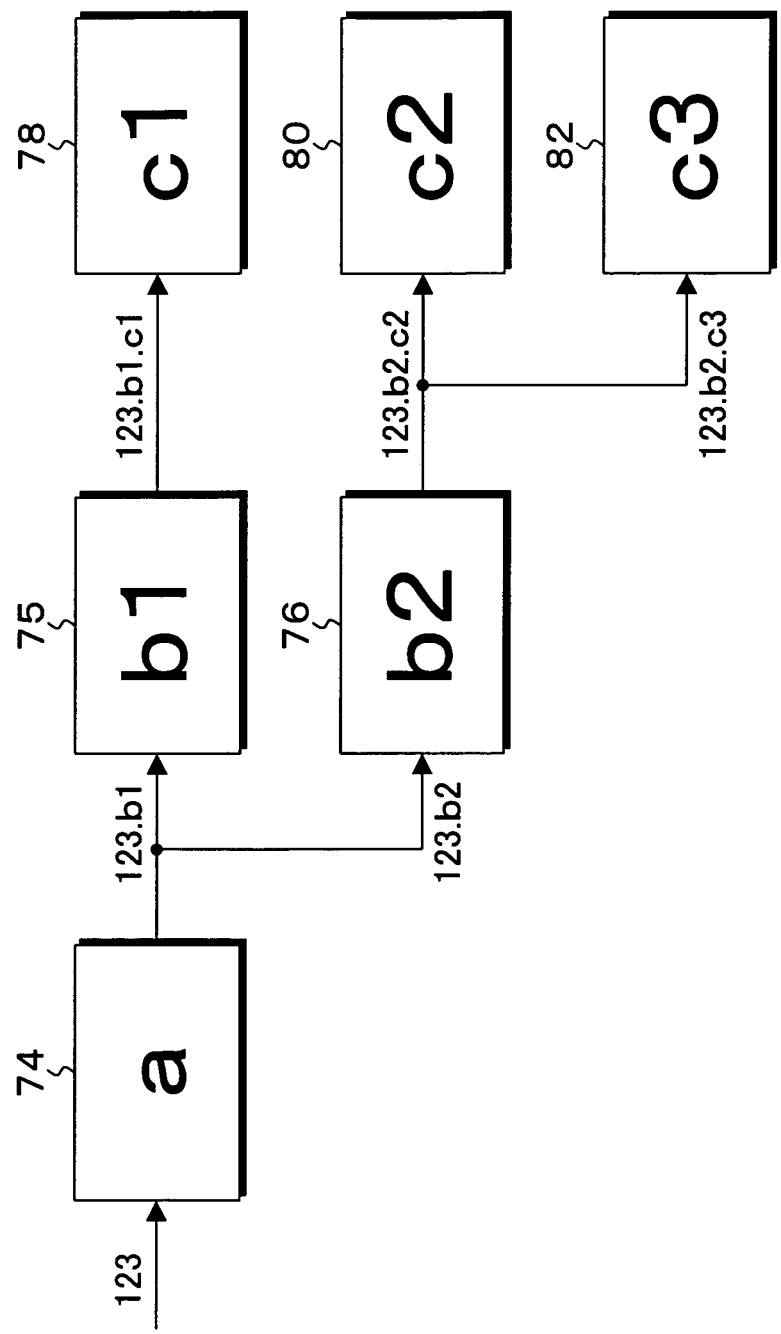

FIG. 12

| TIME INFORMATION | IP ADDRESS | PROCE- SSING ID | RELAY ID | COLLECTION POINT | COMPONENT NAME | IDENTIFICATION INFORMATION IN COMPONENT | METHOD NAME |
|---|---|---|---|---|---|---|---|
| Dec 21 16:4144.00 | 10.1.1.1 | 5 | 12345 | S-RCV | WWW | http://shopping | |
| Dec 21 16:4144.10 | 10.1.1.1 | 5 | 12345 | C-SND | AJP/HTTP | | |
| Dec 21 16:4144.20 | 10.1.1.1 | 10 | 12345 | S-RCV | Servlet | /cart | |
| Dec 21 16:4144.32 | 10.1.1.1 | 10 | 12345 | C-SND | CORBA | | |
| Dec 21 16:4144.52 | 7.1.1.2 | 20 | 12345 | S-RCV | EJB | EJBCONT1$EJBAPL1 | create |
| Dec 21 16:4144.72 | 7.1.1.2 | 20 | 12345 | C-SND | DB | jdbc:odbc:hello | SELECT |
| Dec 21 16:4145.52 | 7.1.1.2 | 20 | 12345 | S-RCV | DB | jdbc:odbc:hello | SELECT |
| Dec 21 16:4146.72 | 7.1.1.2 | 20 | 12345 | C-SND | EJB | EJBCONT1$EJBAPL1 | create |
| Dec 21 16:4146.98 | 10.1.1.1 | 10 | 12345 | S-RCV | CORBA | | |
| Dec 21 16:4147.14 | 10.1.1.1 | 10 | 12345 | C-SND | Servlet | /cart | |
| Dec 21 16:4147.24 | 10.1.1.1 | 5 | 12345 | C-RCV | AJP/HTTP | | |
| Dec 21 16:4147.34 | 10.1.1.1 | 5 | 12345 | S-SND | WWW | http://shopping | |

FIG. 14

| TIME INFORMATION | IP ADDRESS | PROCE-SSING ID | RELAY ID | COLLECTION POINT | COMPONENT NAME | IDENTIFICATION INFORMATION IN COMPONENT | METHOD NAME |
|---|---|---|---|---|---|---|---|
| Dec 21 16:4144.00 | 10.1.1.1 | 5 | 1234567 | S-RCV | WWW | http://shopping | |
| Dec 21 16:4144.10 | 10.1.1.1 | 5 | 1234567 | C-SND | AJP/HTTP | | |
| Dec 21 16:4144.20 | 10.1.1.1 | 10 | 1234567 | S-RCV | Servlet | /cart | |
| Dec 21 16:4144.32 | 10.1.1.1 | 10 | 1234567 | C-SND | CORBA | | |
| Dec 21 16:4144.52 | 7.1.1.2 | 20 | 1234567 | S-RCV | EJB | EJBCONT1$EJBAPL1 | create |
| Dec 21 16:4144.72 | 7.1.1.2 | 20 | 1234567 | C-SND | DB | jdbc:odbc:hello | SELECT |
| Dec 21 16:4145.52 | 7.1.1.2 | 20 | 1234567 | S-RCV | DB | jdbc:odbc:hello | SELECT |
| Dec 21 16:4146.12 | 7.1.1.2 | 20 | 1234567 | C-SND | EJB | EJBCONT1$EJBAPL1 | create |
| Dec 21 16:4146.34 | 10.1.1.1 | 10 | 1234567 | S-RCV | CORBA | | |
| Dec 21 16:4146.50 | 10.1.1.1 | 10 | 1234567 | C-SND | Servlet | /cart | |
| Dec 21 16:4146.70 | 10.1.1.1 | 10 | 1234567 | S-RCV | CORBA | | |
| Dec 21 16:4147.90 | 15.1.1.1 | 30 | 1234567 | C-SND | TD | | |
| Dec 21 16:4148.10 | 15.1.1.1 | 30 | 1234567 | S-RCV | TD | | |
| Dec 21 16:4148.22 | 10.1.1.1 | 10 | 1234567 | C-CND | CORBA | | |
| Dec 21 16:4148.32 | 10.1.1.1 | 10 | 1234567 | S-RCV | Servlet | /cart | |
| Dec 21 16:4148.42 | 10.1.1.1 | 5 | 1234567 | C-RCV | AJP/HTTP | | |
| Dec 21 16:4149.52 | 10.1.1.1 | 5 | 1234567 | S-SND | WWW | http://shopping | |

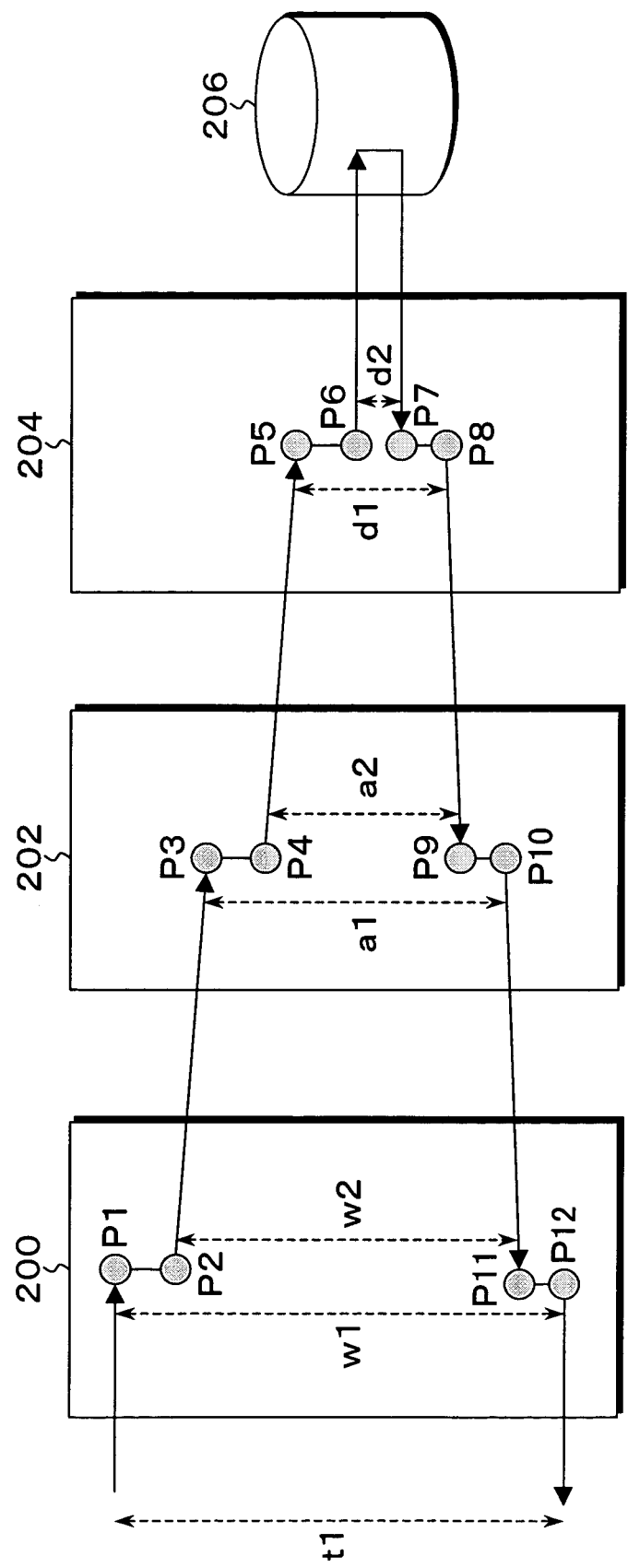

TRACE PROCESSING PROGRAM, METHOD AND SYSTEM

BACKGROUND OF THE INVENTION

1. Field of the Invention

The present invention relates generally to a trace processing program, method and apparatus for a distributed application system achieving application services via a network and, more particularly, to a trace processing program, method and apparatus for collecting traces and identifying a bottleneck point which has caused degradation of responses.

2. Description of the Related Arts

In a network-enabled distributed application system, a plurality of servers is configured on multilayer, and applications operated thereon are also intricately combined wherein one (1) service is achieved by operating each one coordinately. In such complicated distributed application system, in order to identify a bottleneck point which has caused degradation of responses, research and analysis are performed by, for example, putting in chronological order and linking trace information in which behavior of an application is recorded. Collection of trace information is recorded and accumulated at an entry point when the executed application (including a program or a module in the program) is invoked and an exit point when a process is terminated, with time information when each point is passed through.

FIG. 17 illustrates conventional collection of trace information, wherein a web server 200, an application server 202, a database server 204 and a database 206 are arranged in hierarchical configuration, and a request telegraphic message from a client is processed by executing an application of each server and responded by, for example, searching the database 206. The trace information is collected at point P1 to P12 which are entry points and exit points of the executed applications. If a transaction response t1 is degraded, a bottleneck point can be identified by comparing transaction responses w1, w2, a1, a2, d1 and d2 of the servers obtained from the trace information with those of normal time. In order to facilitate linking of trace information for checking what calling-relationship each intricately combined application has cooperated in, some systems are ingeniously designed about recorded information, wherein, for example, not only the time information of entry and exit points, but also information of a next-invoked application is recorded, as shown in FIGS. 1A and 1B. FIG. 1A shows an example of a transaction distribution, and correspondingly, as shown in FIG. 1B, calling-hierarchy information of each application is generated (see, e.g., Japanese Patent Application Laid-Open Publication Nos. 1989-277940, 1992-84234 and 2001-318809).

However, a trace processing method of a conventional distributed application system has following problems. First, the conventional distributed application system has too large overhead. In a distributed application system, information subject to tracing, such as entry-point information and exit-point information of each application and calling-relationship information will be extremely huge volumes of information, so that the overhead of the system will be generated considerably. Therefore, operation in which traces are always collected in case of unanticipated situation is practically impossible, and the only possible operation is, for example, collecting traces after a trouble has occurred to the extent that effects on the system will be as small as possible, so that it takes a long time to seek out the cause of a bottleneck. Also, in conventional trace processing method, operation in the distributed application system is complicated. In FIG. 2, is traces are collected by targeting the distributed application system, switches 208, 210 and 212 for indicating whether traces exist or not are equipped in the system or each application on each server 200, 202 and 204. Therefore, if traces are collected after a trouble has occurred, a manager has to turn on many switches and has to decide which switch should be turned on, so that the manager is forced into very complicated operation.

SUMMARY OF THE INVENTION

According to the present invention there is provided a trace processing method, program and apparatus targeting a distributed application system which enables quick identification of a bottleneck by minimizing an overhead of trace collection. The present invention provides a trace processing program executed by a computer that makes up a server provided with a first layer application firstly processing a request telegraphic message of a client. The program causes the computer to execute:

a trace condition embedding step of, when the request telegraphic message is received from the client, embedding preset trace collection conditions including switch information that indicates whether trace collection is to be made or not into a relay code, for transfer to a next application; and a trace collection step of deciding for processing whether trace collection is to be made or not based on the switch information of the trace collection conditions embedded into the relay code, and when the request telegraphic message is received from another application, deciding for processing whether trace collection is to be made or not based on the switch information of the trace collection conditions embedded into the relay code of the request telegraphic message.

The present invention provides a trace processing program executed by a computer that makes up a server provided with a second or subsequent layer application secondly or subsequently processing a request telegraphic message of a client. The program causes the computer to execute a trace collection step of, when the request telegraphic message is received from another application, deciding for processing whether trace collection is to be made or not based on a switch information of trace collection conditions embedded into a relay code of the request telegraphic message. The trace condition embedding step includes using a function ID that indicates a range of trace collection for each application and a relay ID that records applications that have passed therethrough. The trace condition embedding step includes generating a unique relay ID when trace collection is indicated by the switch information, and the trace collection step includes adding an identifier of a next invoked application to the backward of the relay ID. The trace condition embedding step further includes using as the trace collection conditions intermittent switch information that indicates a ratio of trace collection to reception times of the request telegraphic message when trace collection is indicated by the switch information and embedding the trace collection conditions into the relay code in accordance with a ratio of the intermittent switch information. The intermittent switch information identifies a route of the request telegraphic message and indicates a ratio of trace collection to reception times of the request telegraphic message for each identified route. The intermittent switch information indicates a ratio of trace collection to reception times of the request telegraphic message within a range of zero (0) percent to 100 percent. An analysis display step includes extracting trace information of a route in accordance with a relay ID from trace information collected for each application in the trace collection step, sorting the information in order of time and generating for display a route and relationship between each application and processes based on the result of sorting. More specifically, the analysis display step includes displaying a processing time from reception of the request telegraphic message to transfer to the next application in such a manner as to correspond to each application which is a passing point. The analysis display step may include displaying a ratio of a processing time for each application from reception of the request telegraphic message to transfer to the next application to a total processing time from reception of the request telegraphic message at an entry application to response in such a manner as to correspond to each application which is a passing point.

The present invention is directed to a trace processing method for a distributed application system that has a plurality of applications running on a plurality of servers arranged hierarchically and that, when a request telegraphic message is received from a client, executes processes for response while transferring a relay code between applications in order, the method comprising:

a trace condition embedding step of, when the request telegraphic message is received, embedding preset trace collection conditions including switch information that indicates whether trace collection is to be made or not into the relay code, for transfer to a next application; and a trace collection step that is provided in each of the applications, the trace collection step including, when the request telegraphic message is received, deciding for processing whether trace collection is to be made or not based on the switch information of the trace collection conditions embedded into the relay code.

The present invention is directed to a trace processing apparatus for a distributed application system that has a plurality of applications running on a plurality of servers arranged hierarchically and that, when a request telegraphic message is received from a client, executes processes for response while transferring a relay code between application processing units in order, the trace processing apparatus comprising:

a trace condition embedding unit that when the request telegraphic message is received, embeds preset trace collection conditions including switch information that indicates whether trace collection is to be made or not into the relay code, for transfer to a next application; and a trace collection unit that is provided in each of the application processing units and that, when the request telegraphic message is received, decides for processing whether trace collection is to be made or not based on the switch information of the trace collection conditions embedded into the relay code. Details of the trace processing method and apparatus are essentially the same as those of the trace processing program.

According to the present invention, in a distributed application system, an overhead of trace collection can be minimized and localized, so that operation in which traces are always collected can be achieved, and it is possible to quickly identify a bottleneck when trouble occurs. Also, since the distributed application system is complex and has a complicated configuration, there is a problem that it is difficult to know where and how applications operate. For such problem, the present invention can easily comprehend how applications operate coordinately.

The above and other objects, features and advantages of the present invention will become more apparent from the following detailed description with reference to the drawings.

BRIEF DESCRIPTION OF THE DRAWINGS

FIG. 7 is an explanatory view of relay ID according to the present invention;

FIG. 12 is an explanatory view of trace information organized for analysis display;

FIG. 14 is an explanatory view of other trace information organized for analysis display;

FIG. 17 is an explanatory view of trace collection point in conventional distributed application system.

DETAILED DESCRIPTION OF THE PREFERRED EMBODIMENTS

Figure 1A:
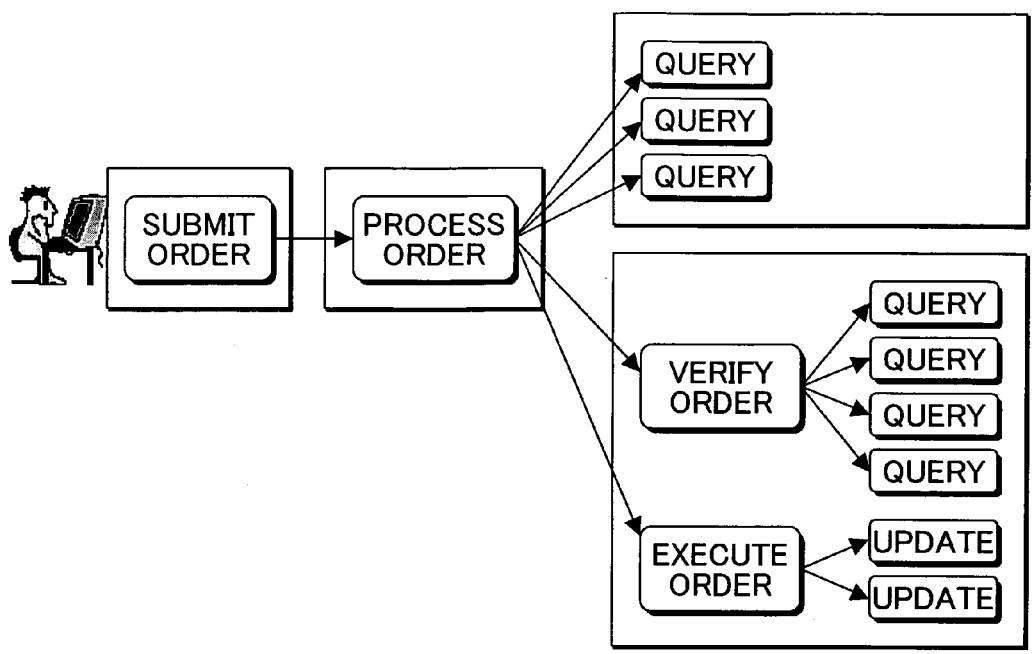
FIGS. 1A and 1B are explanatory views of taking-over relationship which is collected in conventional trace process.
Figure 1B:
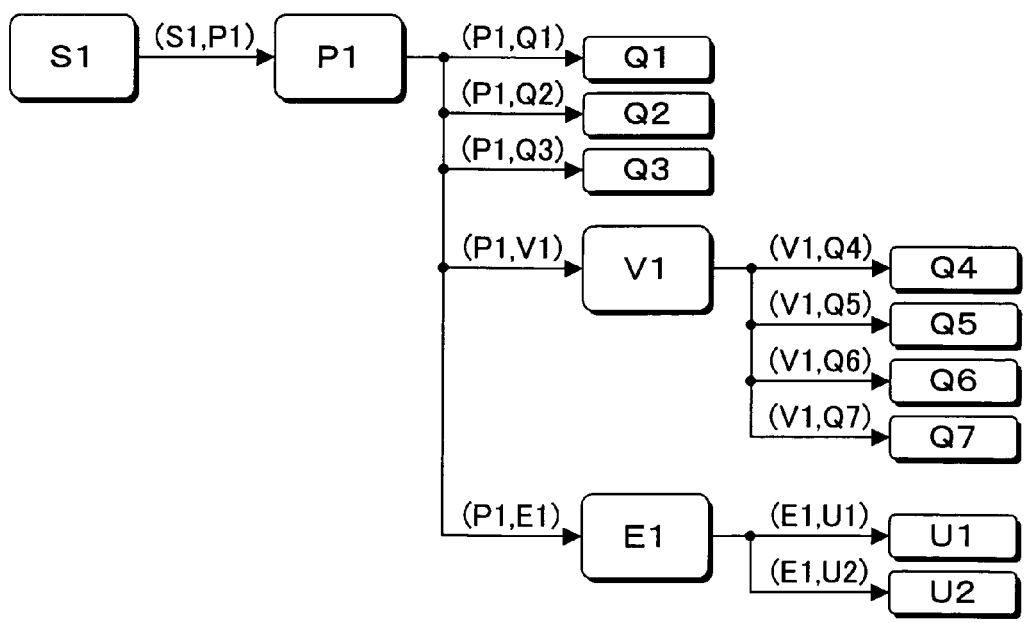
Figure 2:
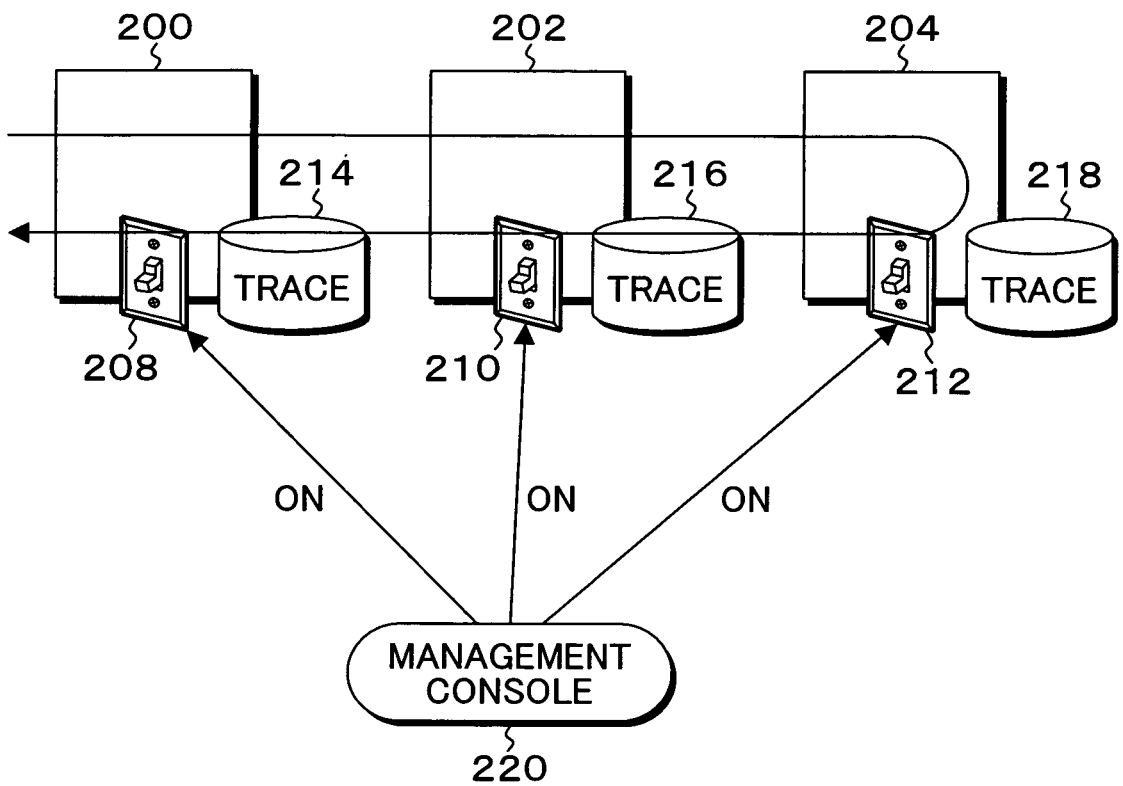
FIG. 2 is an explanatory view of switch manipulation for determining whether trace needed for each application exist or not in conventional distributed application system.
Figure 3:
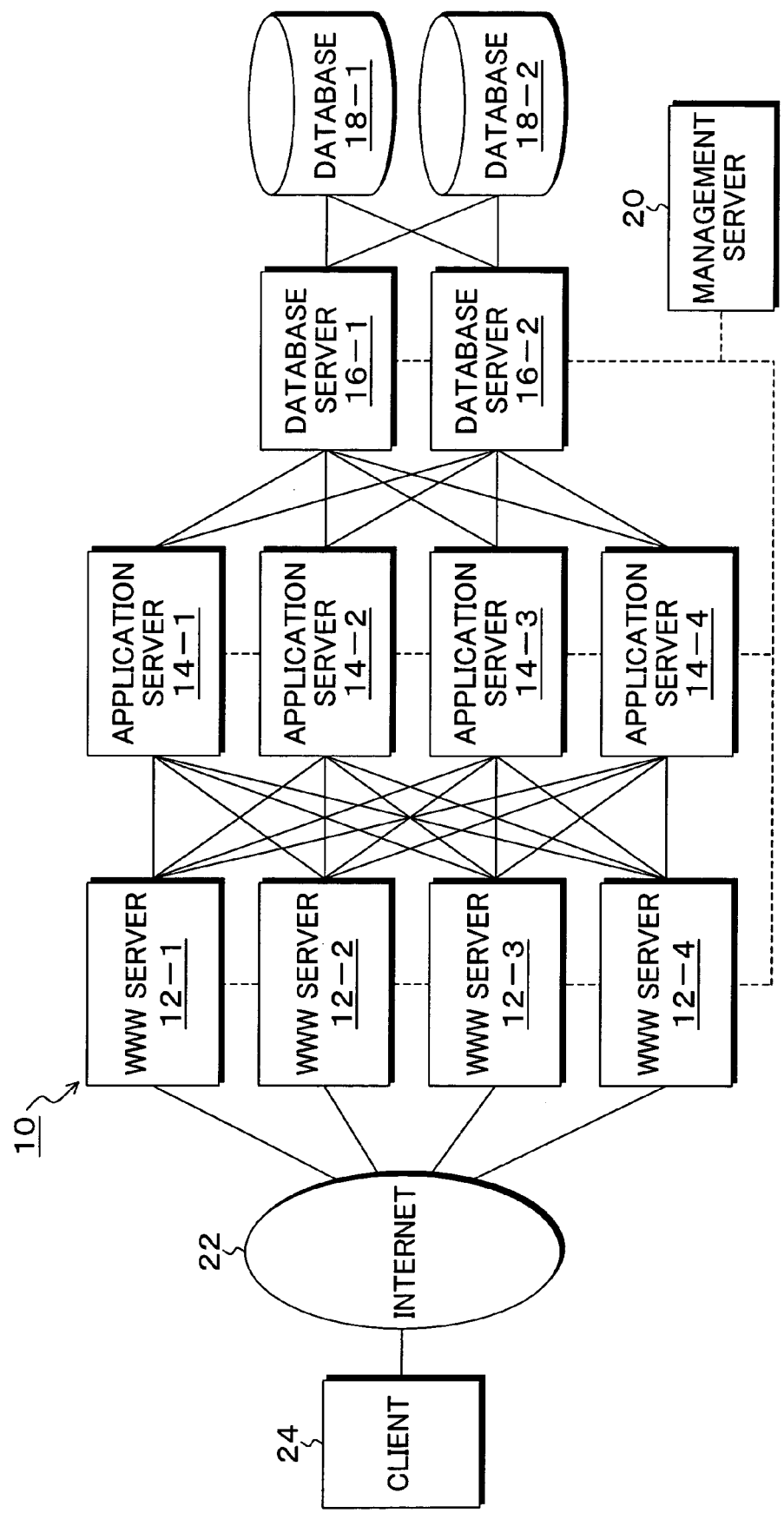
FIG. 3 is an explanatory view of distributed application system to which the present invention is applied.

FIG. 3 is an explanatory view of a distributed application system to which the present invention is applied. In FIG. 3, in the distributed application system 10, a plurality of servers is hierarchically arranged. In this example, web servers 12-1, 12-2, 12-3 and 12-4 are provided on the entry side of the system which receives a request telegraphic message from a client 24 via Internet 22, application servers 14-1, 14-2, 14-3 and 14-4 are provided on the next layer, database servers 16-1 and 16-2 are provided on the third layer, and database 18-1 and 18-2 are connected to the database servers 16-1 and 16-2, respectively. Web servers 12-1 to 12-4, application servers 14-1 to 14-4 and database servers 16-1 and 16-2 arranged hierarchically in the distributed application system are mutually connected by inputs and outputs and, for example, in searches of database 18-1 and 18-2, a process for the request telegraphic message is executed and responded via complicated process paths which run through applications arranged hierarchically. In a plurality of server arranged hierarchically which constructs the distributed application system, when the web servers 12-1 to 12-4 on the entry side receive the request telegraphic message from the client 24 via Internet 22, operation is conducted as transferring a keyword which is referred to as a relay code between applications in order. For the hierarchically arranged servers which construct the distributed application system 10, a management server is provided. To the web servers 12-1 to 12-4 located on the entry side, the management server 20 sets a trace collection condition which is embedded into the relay code which is added to the request telegraphic message from the client 24 and transferred between applications. Also, the management server 20 performs process for collecting, analyzing and displaying trace information which is accumulated in each server 14.

Figure 4:
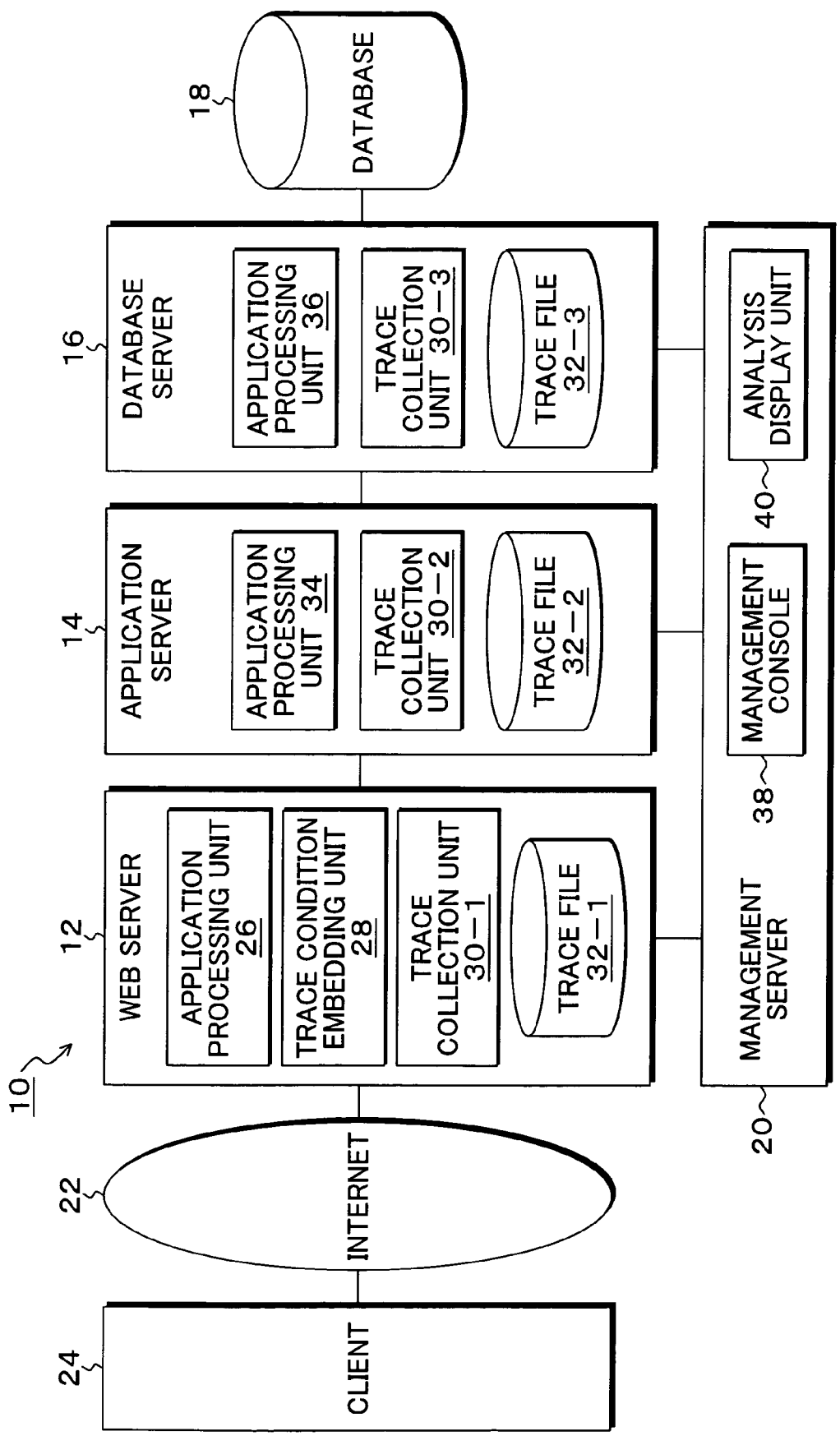
FIG. 4 is a block diagram of function structure of trace process according to the present invention.

FIG. 4 is a block diagram of a function structure of a trace process according to the present invention and takes out and shows one (1) route from the client 24 to the database 18 in the distributed application system 10 of FIG. 3. In FIG. 4, a request telegraphic message from a client 24 is received by a web server 12 located on the entry side via Internet 22, and after execution of an application of the web server 12, an application of a next application server 14 and an application of a database server 16, access to a database 18 is performed, and a result of the access is responded to the client 24 side via the application of the database server 16, the application of the application server 14 and the application of the web server 12. Therefore, each of the web server 12, the application server 14 and the database server 16 is provided with an application processing unit 26, 34 and 36 which act as application programs, respectively. The web server 12 located at the entry of the distributed application system 10 is provided with a trace condition embedding unit 28. When receiving the request telegraphic message from client 24, the trace condition embedding unit 28 embeds a trace collection condition preset by manipulation of a management console 38 of a management server 20 into the relay code which is transferred between applications and transfers it to the application processing unit 34 of the next application server 14. Trace collection units 30-1, 30-2 and 30-3 decides whether trace collection will be performed or not based on the trace collection condition embedded into the relay code, collects trace information associated with execution of transactions of the application processing unit 26, 34 and 36 based on reception of the request telegraphic message if there is a trace indication, and accumulates the information into trace files 32-1, 32-2 and 32-3. If there is not the trace indication, the trace collection will not be performed and, in other words, traces will be ignored.

Figure 5:
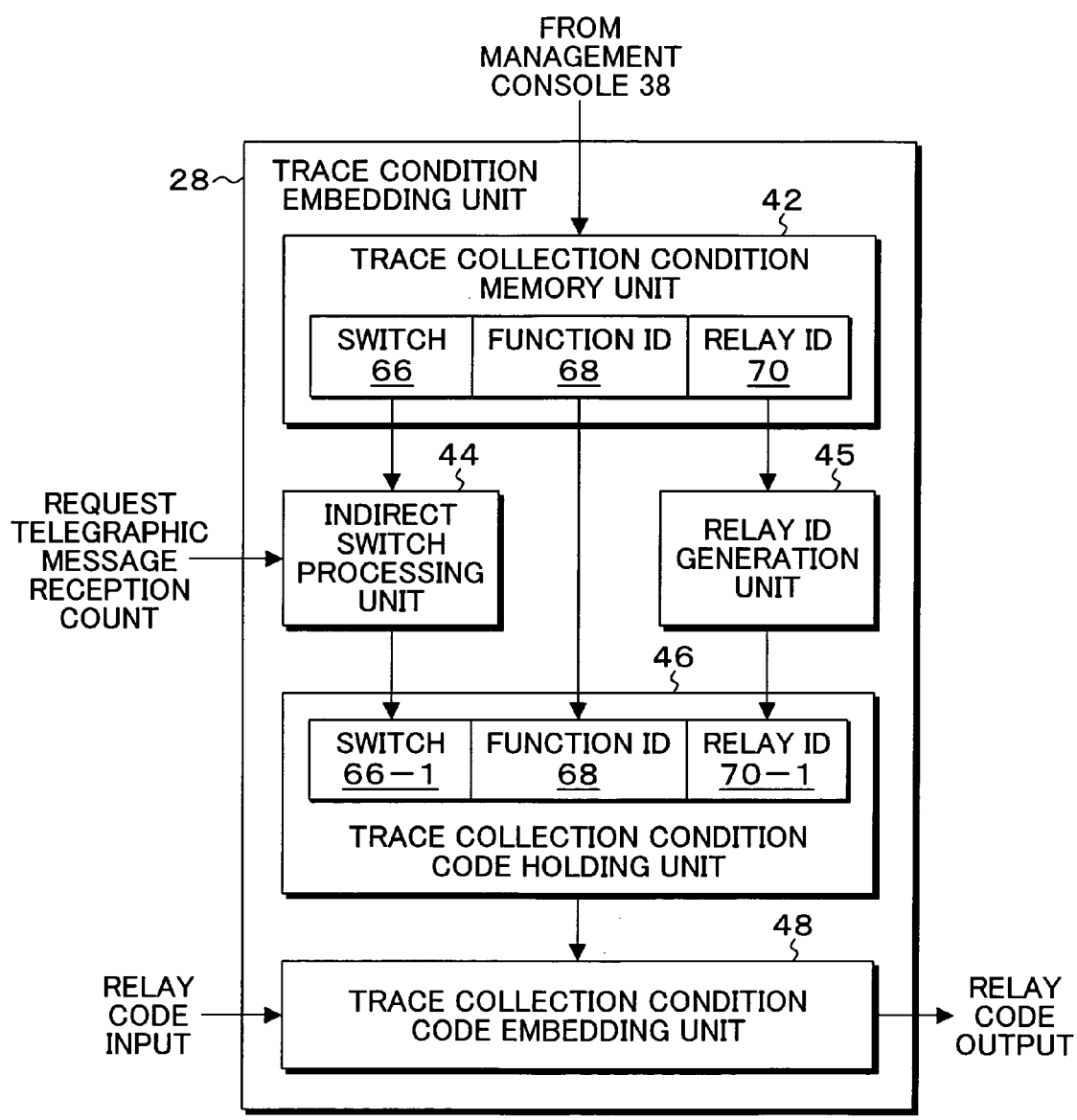
FIG. 5 is a block diagram of function structure of trace condition embedding unit provided in web server of FIG. 4.

FIG. 5 is a block diagram of a function structure of the trace condition embedding unit 28 provided in web server 12 of FIG. 4. In FIG. 5, the trace condition embedding unit 28 is provided with a trace collection condition memory unit 42, an indirect switch processing unit 44, a relay ID generation unit 45, a trace collection condition code holding unit 46 and a trace collection condition code embedding unit 48. In the trace collection condition memory unit 42, a switch 66, a function ID 68 and a relay ID 70 are memorized as a trace collection condition by manipulation of the management console 38 provided in the management server 20 of FIG. 4. The switch 66 memorized in the trace collection condition memory unit 42 indicates on or off of tracing and, with this indication, it is determined that traces are collected or not when the application processing unit 26 of FIG. 4 receives and performs process for the request telegraphic message from the client 24.

Figure 6A:
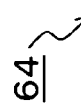
FIGS. 6A and 6B are explanatory views of trace collection condition and indirect switch information embedded into relay code.
Figure 6B:

FIGS. 6A and 6B are explanatory views of a trace collection condition and indirect switch information set in the trace collection condition memory unit 42 of FIG. 5 by indications from the management console 38. The trace collection condition 64 of FIGS. 6A and 6BA has the switch 66, the function ID 68 and the relay ID 70 as embedded information. The switch 66 has a size of 4 byte, the function ID 68 has a size of 4 byte and the relay ID 70 has variable length. The switch 66 indicates on/off which indicates whether traces will be collected or not. The switch 66 sets on or off of tracing only in the web server 12 provided with the application processing unit 26 which executes the application of the first layer as shown in FIG. 4, and if the web server 12 is turned on once for the trace collection, the trace collection condition including the switch 66 is embedded into the relay code which is transferred between the applications, and sent to the subsequent applications after the first layer. Therefore, in the subsequent application processing unit 34 and 36, without performing the switch manipulation from the management console 38 side, the trace collection is automatically conducted based on the indication of the switch 66 of the trace collection condition 64 embedded into the relay code. Therefore, the switch 66 acts as an interlocking switch for trace collection among the applications. The function ID 68 determines a range of tracing such that traces are collected for a certain function. Therefore, on the route of a series of applications associated with reception of the request telegraphic message, it is possible to specify trace collection for a certain application only. The relay ID 70 is information for linking calling-relationships of applications when trace information is analyzed and, by tracking the relay ID 70, it is possible to analyze what route of applications a request telegraphic message has passed through. For the relay ID, a unique ID within the distributed application system, for example, a timestamp added with a process ID is generated by default, and after that, every time applications are passed, identifiers of the applications which are invoked next are added backward.

FIG. 7 is an explanatory view of the relay ID in the trace process according to the present invention and this is a case that an application 74 is located on the first layer which is the entry side, applications 75 and 76 are located on the second layer and applications 78, 80 and 82 are located on the third layer. If a request telegraphic message to the application 74 on the first layer is received, a relay code into which the trace collection condition of FIG. 6A is embedded is added and, as a relay ID in this case, "11231" which is a unique ID with in the distributed application system is generated. Then, the request telegraphic message added with the relay code is transferred from the application 74 on the first layer to the application 75 or the application 76 on the second layer, and if it is transferred to the application 75, an identifier of the application 75 "b1" is added to the original relay ID "123" and a relay ID "123.b1" is generated. If it is transferred to the application 76, an identifier of the application 76 "b2" is added and a relay ID "123.b2" is generated. Similarly, when it is transferred from the application 75 on the second layer to the application 78 on the third layer, the relay ID will be "123.b1.c2", and if it is transferred from the application 76 on the second layer to the application 80 on the third layer, the relay ID will be "123.b2.c2". If it is transferred from the application 76 on the second layer to the application 82 on the third layer, the relay ID will be "123.b2.c3". These relay IDs are stored in the application on each layer with trace data associated with trace collection, so that, by tracking the relay IDs when collecting trace information by the management server, it is possible to analyze what route a request telegraphic message has passed through each application. Referring again to FIG. 5, the indirect switch processing unit 44 reads out the switch memorizing the ON status which is recorded in the trace collection condition memory unit 42 every time a request telegraphic message reception count is obtained and, based on indirect switch information memorized by indications from the management console 38, writes a switch 66-1 into the trace collection condition code holding unit 46, wherein, for example if it is "1% switch", out of 100 request telegraphic message reception counts, the switch will be turned on for one (1) count and turned off for remaining 99 counts. FIG. 6B is an explanatory view of intermittent switch information set in the indirect switch processing unit 44 by the management console 38. In the intermittent switch information 72, an intermittent switch is set as setting information and, for a setting detail, a value of n is specified as "n % switch". For the "n % switch" in the intermittent switch information 72, the value of n can be arbitrarily set to a range between 0 and 100%. For the "n % switch", a "1% switch", "0.1% switch" or the like is set. In the case of the "1% switch", the trace collection condition in which the switch has been turned on is embedded into the relay code and transferred to the next application once per 100 receptions of the request telegraphic messages. In the case of the "0.1% switch", the trace collection condition in which the switch has been turned on is embedded into the relay code and transferred to the next application once per 1000 receptions of the request telegraphic messages. With such setting of the intermittent switch information 72, by reducing a rate of the trace collection to the request telegraphic messages, the overhead to the distributed application system can be minimized and, during normal operation, the operation in which traces are always collected can be achieved. Since, for the "n % switch" in the intermittent switch information 72, the value of n can be arbitrarily set to a range between 0 and 100%, if it is set to "0% switch", the trace collection is never performed in operation. If it is set to "100% switch", trace information is collected for every request telegraphic message and this is equivalent to disabling a function of the indirect switch processing unit 44. The rate of trace collection depending on the "n % switch" will be following two (2) methods.

(1) Equally-spaced trace collection
(2) Random trace collection

Taken "0.5% switch" as an example, the trace collection wherein trace switch has been turned on is performed five (5) times per 1000 receptions of the request telegraphic messages, and in the case of the equally-spaced trace collection, the trace collection is performed at 200th, 400th, 600th, 800th and 1000th receptions. On the other hand, in the case of the random trace collection, by using random numbers, the trace collection is performed at, for example, 142nd, 262nd, 438th, 626th and 854th receptions per 1000 receptions of the request telegraphic messages. According to the random trace collection, the process will be more complicated than the equally-spaced trace collection, but it has an advantage that periodic dependency can be reduced. Further, in the distributed application system, the applications are executed in order through different routes depending on details of the request telegraphic messages, and if the routes of the applications are different, the intermittent switch information 72 will be set for each route. In setting of the intermittent switch information for each route, because the route is defined by a type of the request telegraphic message, one should embed into the relay code a trace collection condition wherein the type of the request telegraphic message is determined and the switch is turned on depending on the rate of the corresponding intermittent switch information. As a result, even in the case of the distributed application system where a large variety of request telegraphic messages with different routes are mixed, it is possible to set the rate of performing the trace collection for each route with the indirect switch information and to always collect traces during normal operation with the overhead of each route minimized. Referring again to FIG. 5, the relay ID generation unit 45 adds an identifier of next destination application to a unique relay ID within the system memorized in the trace collection condition memory unit 42 and writes it into the trace collection condition code holding unit 46 as a relay ID 70-1. The function ID 68 memorized in the trace collection condition memory unit 42 is directly written into the trace collection condition code holding unit 46. When the application processing unit 26 receives the request telegraphic message from the client and transfers it to the next application, the trace collection condition code embedding unit 48 inputs a relay code which will be added to the request telegraphic message, embeds into the relay code a trace collection condition code consisting of the switch 66-1, the function ID and the relay ID and outputs it. Referring again to FIG. 4, the application server 14 and the database server 16 following the web server 12 at the entry are provided with trace collection units 30-2 and 30-3 and trace files 32-2 and 32-3, and for collecting traces, pick up the trace collection condition which is embedded into the relay code by the trace condition embedding unit 28 of the web server 12 on the entry side to perform trace collection based on this. When transferring to the next application, the trace collection unit 30-1 will send the relay ID after adding an identifier of the next application to it.

Figure 8:
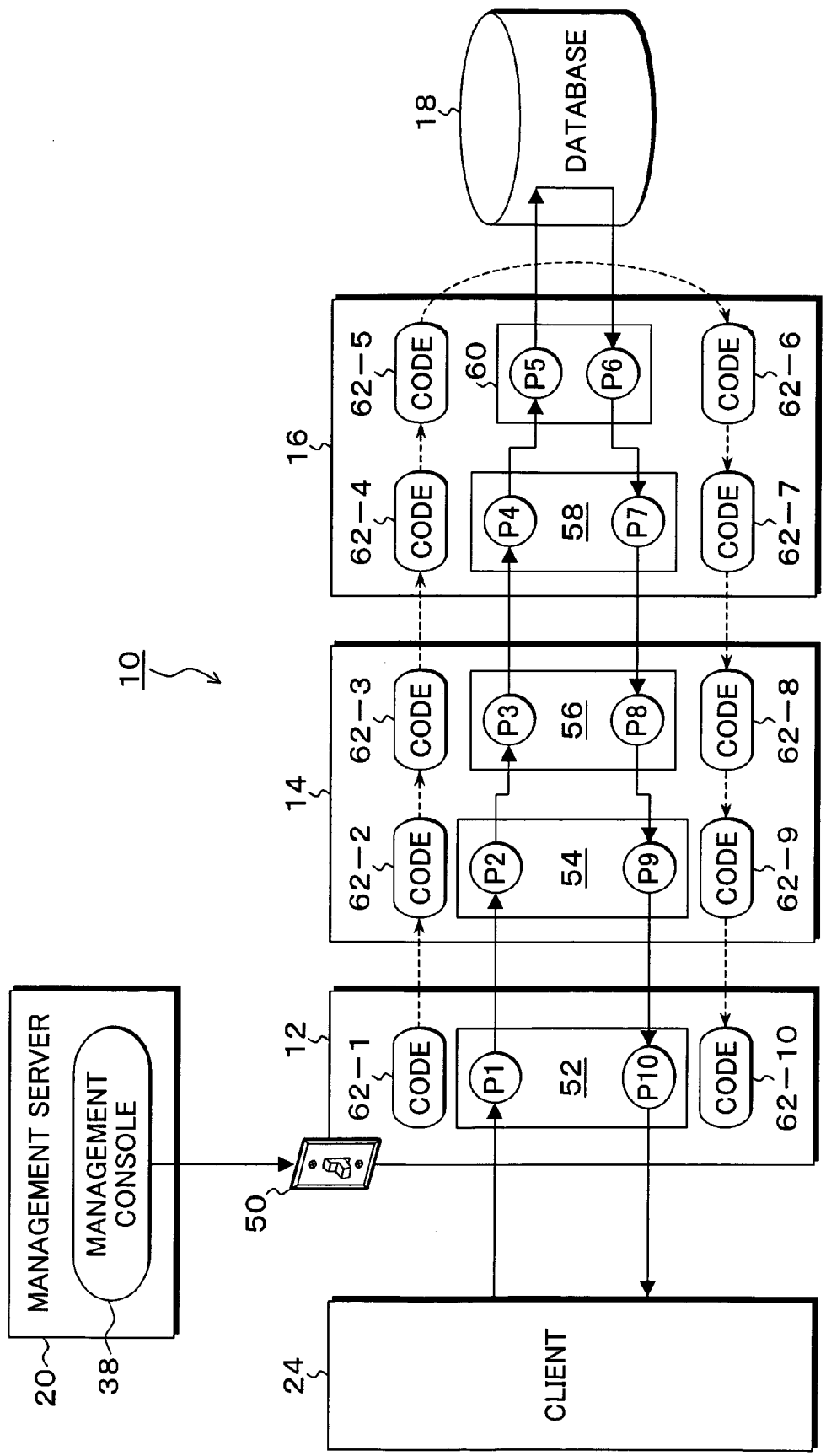
FIG. 8 is an explanatory view of trace process according to the present invention, wherein request telegraphic message is transferred after adding a relay code having trace collection condition embedded therein.

FIG. 8 is an explanatory view of a trace process when the request telegraphic message from the client is received in the distributed application system 10 of FIG. 4. In FIG. 8, the web server 12 is provided with a component 52 as an application, the application server 14 is provided with components 54 and 56 as applications and the database server 16 is provided with components 58 and 60 as applications. In the distributed application system 10, when the requested telegraphic message is received from the client 24, transactions are sequentially executed in the components 52, 54, 56, 58 and 60, and when the requested telegraphic message is transferred to the next application, the relay code is added and transferred as shown by relay codes 62-1 to 62-10. For such request telegraphic message from the client 24, in the route where the database 18 is accessed and responds via the web server 12, the application server 14 and the database server 16, passing locations in the components 52, 54, 56, 58 and 60 will respectively be trace collection points P1 to P10. According to the present invention, in the process linking a plurality of applications, if a trace switch 50 has been turned on for trace collection by indication from the management console 38 of the management server 20 in the component 52 which is an application of the web server 12 at the entry which receives the request telegraphic message from the client 24, the detail of the indication of the trace switch 50 is embedded into the relay code 62-1 which is added to the request telegraphic message and transferred to the next component 54, so that the trace collection of subsequent components 54, 56, 58, and 60 can be indicated by manipulating the switch once. Specifically, the function of the trace switch 50 is memorized as the switch 66 in the trace collection condition memory unit 42 of FIG. 5. Also, by determining a tracing range such that traces of certain components are collected with function ID 68 memorized in the trace collection condition memory unit 42 of FIG. 5, trace collection can be performed for certain components on the route of trace collection points P1 to P10. The ratio of embedding the trace collection condition 64 in which switch is turned on into the relay code 62-1 at the web server 12 can be achieved by setting the indirect switch information 72 of FIG. 6B from the management console 38 into the indirect switch processing unit 44 of FIG. 5 and, for example, if "1% switch" has been set, the trace collection condition 64 in which the switch is turned on is embedded into the relay code 62-1 and transferred to the next component 54 only one (1) time out of 100 request telegraphic message reception, and by reducing the ratio of the trace collection to the request telegraphic message reception to 1%, it is possible to minimize the overhead of the distributed application system and achieve the trace collection during normal operation.

Figure 9:
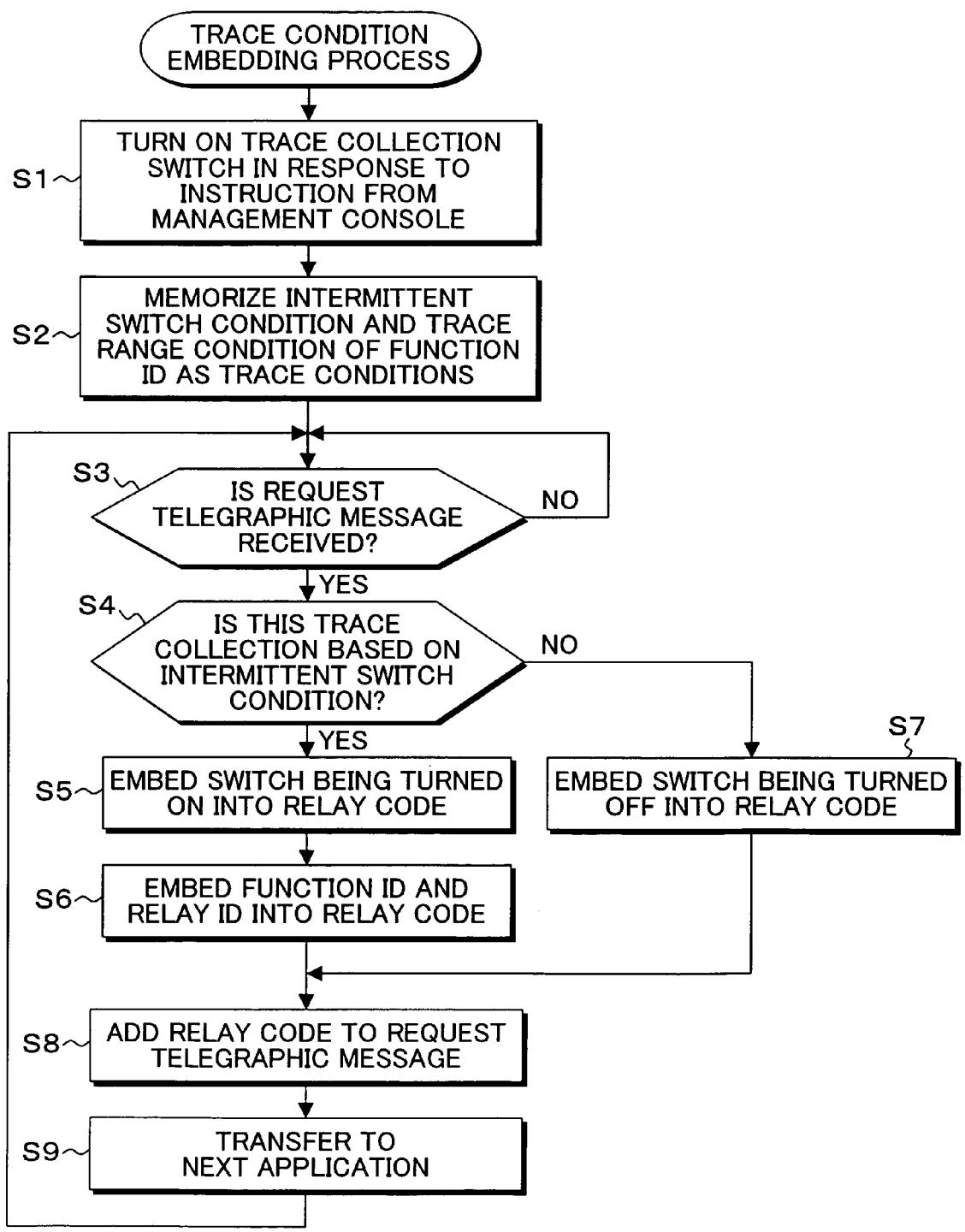
FIG. 9 is a flowchart of trace condition embedding process according to the present invention.

FIG. 9 is a flowchart of the trace condition embedding process according to the present invention, which is performed by the trace condition embedding unit 28 provided in the web server 12 of FIG. 4. In the trace condition embedding process of FIG. 9, it is memorized that the trace collection switch is turned on in response to an indication from the management console 38 in step S1. In order to turn on the trace collection switch, specifically, turning switch on is written into the switch 66 in the trace collection condition memory unit 42 of the trace condition embedding unit 28 of FIG. 5. In step S2, trace collection ratio in accordance with an intermittent switch condition and tracing range condition in accordance with function ID are memorized as a trace collection condition. The intermittent switch condition and function ID are also achieved by writing indirect switch information into the indirect switch processing unit 44 of the trace embedding unit 28 of FIG. 5 and by writing the tracing range information into the function ID 68 of the trace collection condition memory unit 42. Then, in step S3, a request telegraphic message from client is waited. When the request telegraphic message is received, the process proceeds to step S4 and whether it is trace collection based on the intermittent switch condition memorized in step S2 or not is checked. For example, if it is "0.1% switch" and it is 100th reception time of the request telegraphic messages which is counted, it is decided that the trace collection condition is fulfilled and the process proceeds to step S5. In step S5, a switch which is set to ON state is embedded into a relay code. Then, in step S6, function ID and relay ID are embedded into the relay code. In step S8, the relay code is added to the request telegraphic message, and in step S9, it is transferred to the next application. On the other hand, in the case that it is not trace collection based on the intermittent switch in step S4, after a switch which is set to OFF state is embedded into a relay code, the relay code is added to the request telegraphic message in step S8, and in step S9, it is transferred to the next application.

Figure 10:
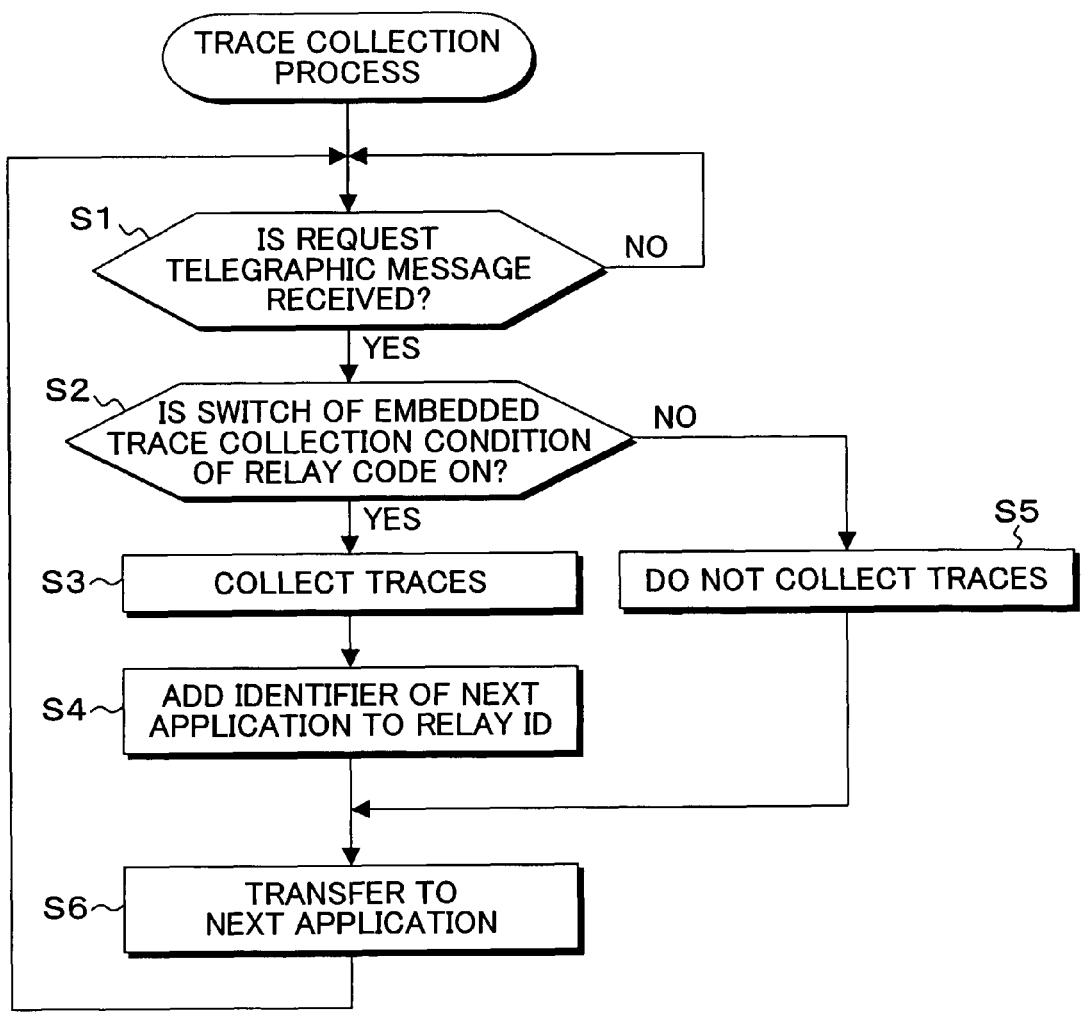
FIG. 10 is a flowchart of trace collection process according to the present invention.

FIG. 10 is a flowchart of the trace collection process according to the present invention. In the trace collection process of FIG. 9, whether the request telegraphic message is received or not is checked in step 1, and when the request telegraphic message is received, details of the relay code added to the request telegraphic message are identified, and if the switch in the trace collection condition embedded in the relay code has been turned on, the process proceeds to step S3 to collect traces. Then, in step S4, an identifier of the next application is added to the relay ID, and in step S6, it is transferred to the next application. On the other hand, if the switch has been turned off in the trace collection condition of the relay code, the process proceeds to step S5 for not collecting traces, and in step S6, it is transferred to the next application. When receiving the request telegraphic message from the client 24, the trace collection unit 30-1 provided in the web server 12 of FIG. 4 does not perform the process of the flowchart of FIG. 10 and performs a process which collects traces if the switch 66 of the trace collection condition memory unit 42 of FIG. 5 has been turned on and does not collect traces if the switch has been turned off. When receiving the relay code which is added to a response telegraphic message from the application server 14, the trace collection unit 30-1 performs the trace collection process in accordance with the flowchart of FIG. 10.

Figure 11:
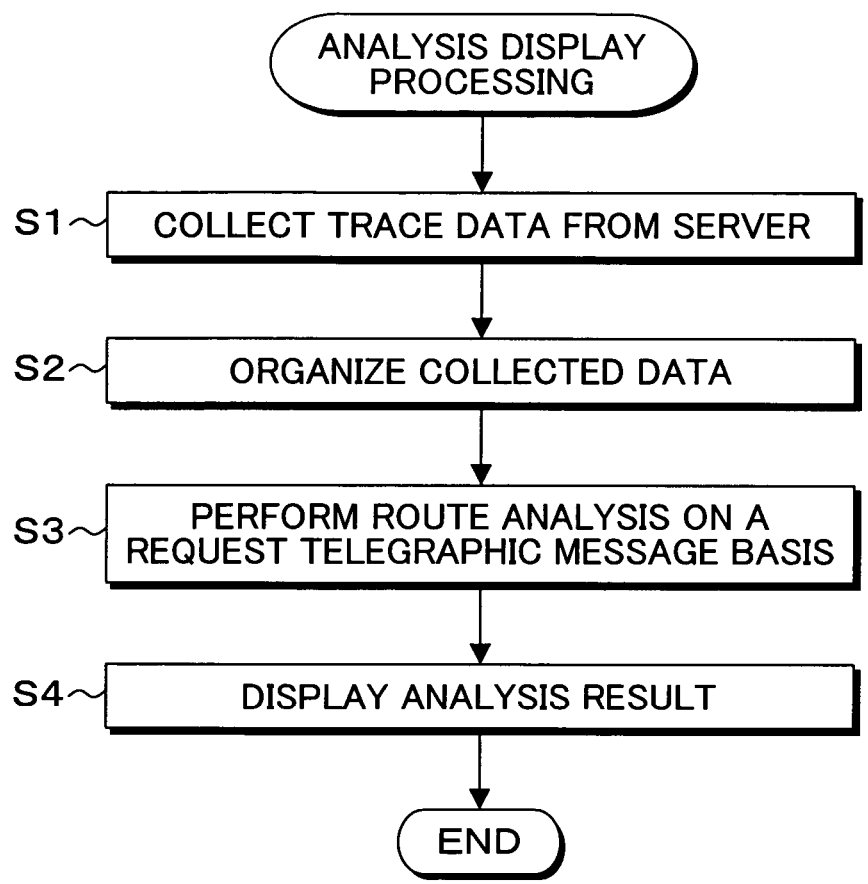
FIG. 11 is a flowchart of analysis display process for trace information according to the present invention.

FIG. 11 is a flowchart of an analysis display process of trace information according to the present invention, which is performed by an analysis display unit 40 of the management server 20 shown in FIG. 4. In the analysis display process of FIG. 11, trace data are collected from a trace file accumulated on the server side following an indication from an operator or the like in step S1. Then, in step S2, the collected data are organized such that the collected data are in order of time of the trace collection points following the route in accordance with relay ID, for example. Then, in step S3, by performing a route analysis in units of the request telegraphic message for organized collected data, time and time ratio required for the process of each application on the route and the like are found and, in step S4, the analysis results are displayed.

FIG. 12 is an explanatory view showing an example of the trace information organized for the analysis display. In trace information 84 of FIG. 12, the data are organized by items of time information 86, IP address 88, process ID 90, relay ID 92, collection point 94, component name 96, identification information in component 98 and method name 100.

Figure 13:
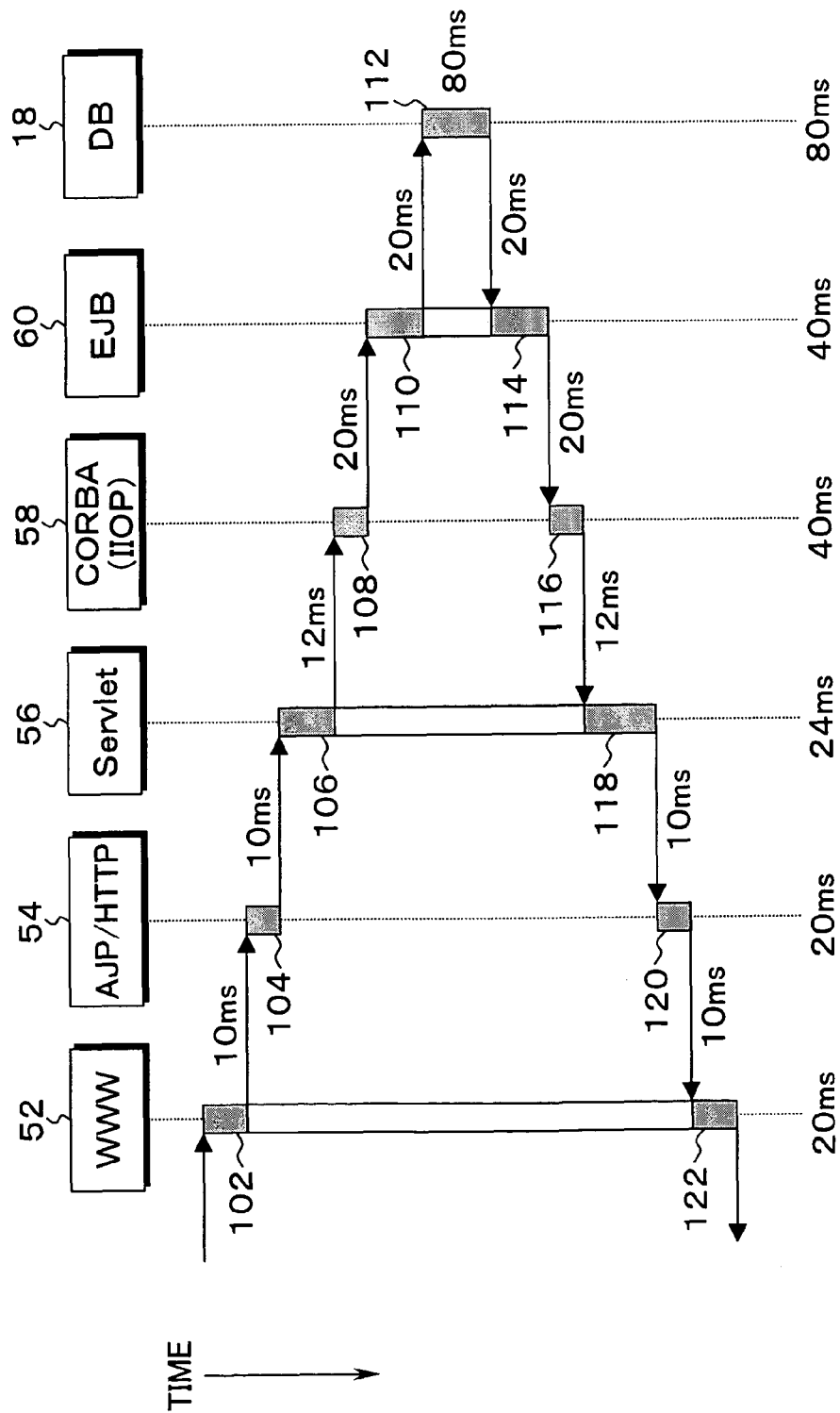
FIG. 13 is an explanatory view of display example of analysis result obtained from organized information of FIG. 12.

FIG. 13 is an explanatory view of a display example of the analysis result obtained from organized information of FIG. 12. In the display example of the analysis result of FIG. 13, for passing points on the route consisting of components 52, 54, 56, 58 and 60 and the database 18, an axis of time is provided in the direction of a vertical axis, and respective execution times 102, 104, 106, ... 102 are displayed in proportion to the length of process time, and for each of execution times 102 to 122, 10 ms, 10 ms, 12 ms, ... 10 ms are displayed. Further, total execution time for the components 52, 54, 56, 58 and 60 and the database 18 is displayed at the lower end. By watching the display of the analysis result of the trace information of FIG. 13, it is possible to decide at a glance that what component's location acts as a bottleneck on the route of processes for the request telegraphic message in the distributed application system.

FIG. 14 is an explanatory view of other trace information organized for the analysis display, and as is the case with FIG. 12, the data are sorted in order of time and organized by items of time information 86, IP address 88, process ID 90, relay ID 92, collection point 94, component name 96, identification information in component 98 and method name 100.

Figure 15:
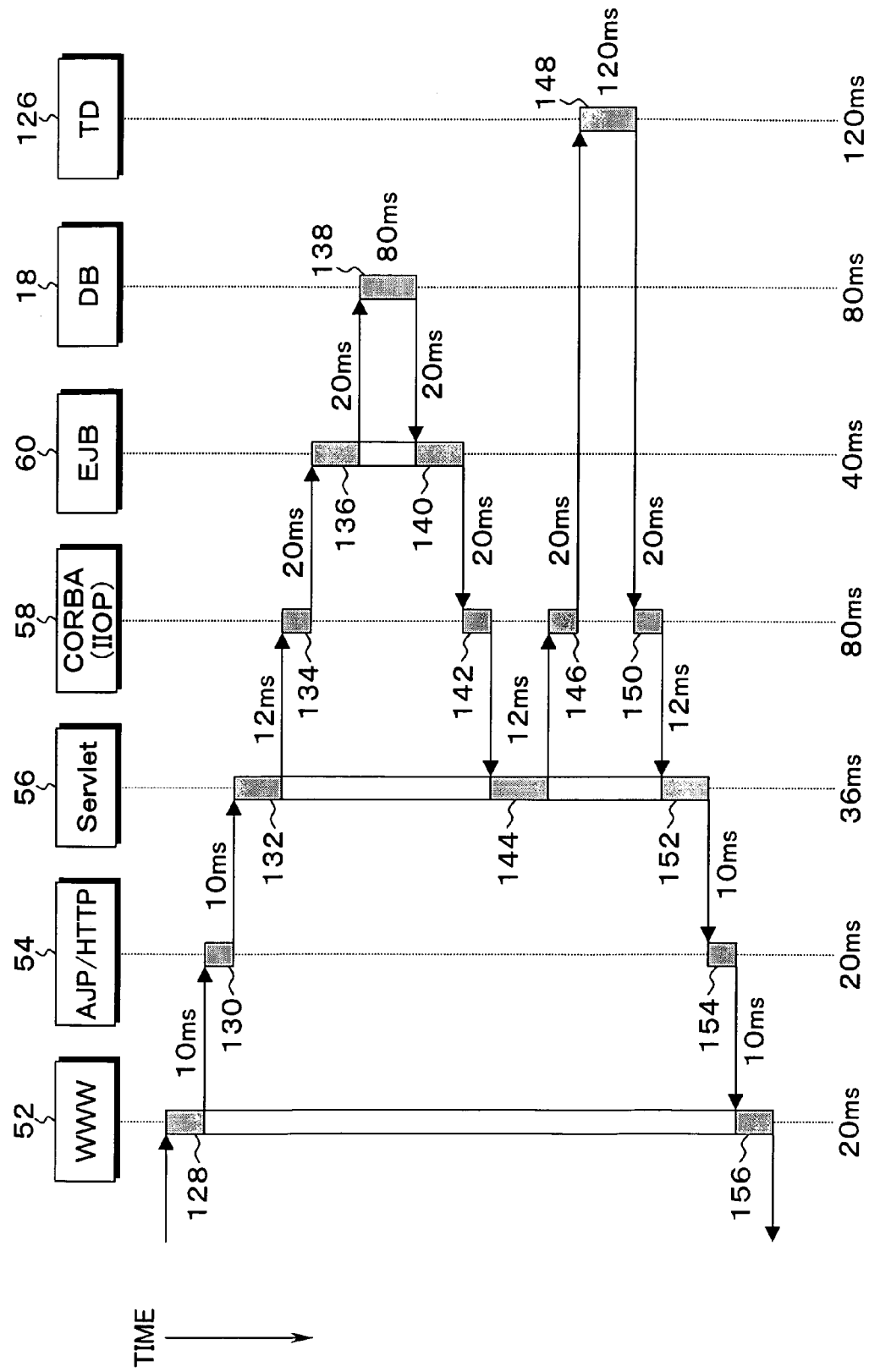
FIG. 15 is an explanatory view of display example of analysis result obtained from organized information of FIG. 14.

FIG. 15 is an explanatory view of a display example which is analyzed from organized information of FIG. 14. In this analysis display for the route of the request telegraphic message of FIG. 15, comparing with FIG. 13, it is understood that a new component 126 is added as a passing point along with the components 52, 54, 56, 58 and 60 and the database 18. Also in this case, by displaying execution times 128 to 156 on a vertical axis and time values of respective execution times for the components 52, 54, 56, 58 and 60 and the database 18 on a horizontal axis and displaying total values of the execution times at lower end, it is possible to easily decide that what location on the route of processes for the request telegraphic message acts as a bottleneck.

Figure 16:
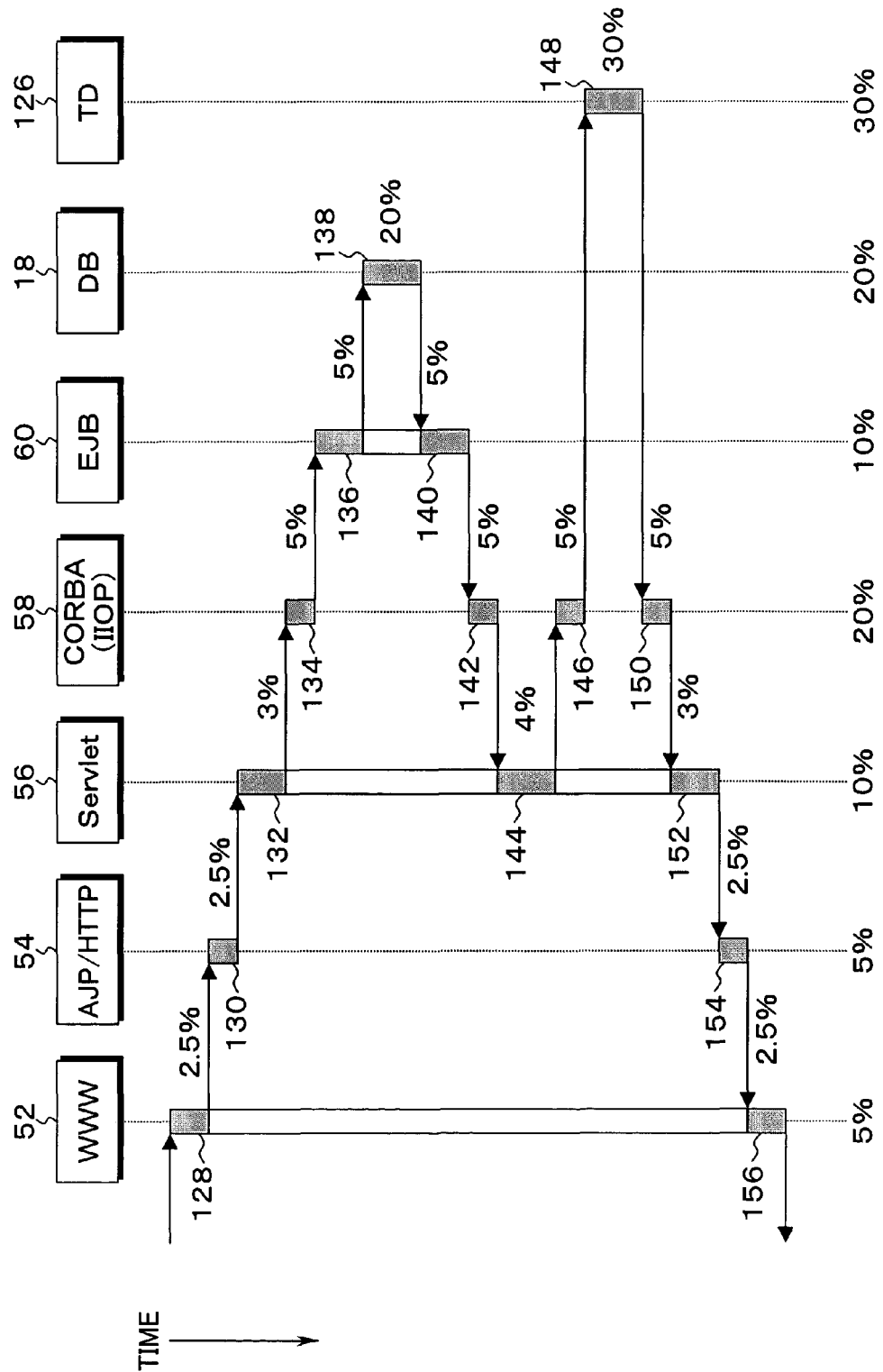
FIG. 16 is an explanatory view of other display example of analysis result obtained from organized information of FIG. 14.

FIG. 16 is another explanatory view of a display example of an analysis result obtained from organized information of FIG. 14 and this display example is characterized by that the execution time of the application is displayed by a response time of the component 52, in other words, a time ratio (percentage) to the entire execution time. Even if the value of the execution time is displayed by the percentage of the time ratio, it is possible to easily decide that what component's location on the route acts as a bottleneck, as is the case with the display example of FIG. 15. In actual decision about the bottleneck, more accurate decision can be made with the value display of the execution time of FIG. 15 than the percentage display of FIG. 16.

The present invention provides a program for the trace process in the web server 12, the application server 14 and the database server 16 of FIG. 4. These servers are achieved by hardware resources of a computer. In the hardware resources of the computer, a bus of CPU is connected with RAM, hard disks, communication boards and the like, and the programs needed for the trace process of the present invention is loaded on the hard disks, and when the computer is activated, necessary programs is read out from the hard disks, deployed on the RAM and executed by the CPU. As the programs for the trace process in the web server 12 located on the entry side of the request telegraphic message of the client 24, a trace condition embedding program in accordance with the flowchart of the trace condition embedding process of FIG. 9 and a program in accordance with the flowchart of the trace collection process of FIG. 10 are stored. On the other hand, for the application server 14 and the database server 16 on and after the second layer, only a trace collection program in accordance with the flowchart of the trace collection process of FIG. 10 is stored and executed. Further, in the management server 20, a analysis display program shown in the flowchart of the analysis display process of FIG. 11 is loaded and executed. The present invention includes any variants and alterations without impairing the object and the benefit thereof, and is not restricted by the numeric values shown in the above embodiments.

What is claimed is:

1. A trace processing method for a distributed application system that has a plurality of applications running on a plurality of servers arranged hierarchically and that, when a request telegraphic message is received from a client, executes processes for response while transferring a relay code between applications in order, the method comprising:
   a trace condition embedding step of, when the request telegraphic message is received, embedding preset trace collection conditions including switch information that indicates whether trace collection is to be made or not in the relay code, for transfer to a next application;
   a trace collection step that is provided in each of the applications, the trace collection step including, when the request telegraphic message is received, deciding for processing whether trace collection is to be made or not based on the switch information of the trace collection conditions embedded in the relay code; and
   an analysis display step of collecting for analysis display traces which have been collected from the applications,
   wherein, the trace condition embedding step further includes using as the trace collection conditions intermittent switch information that indicates a ratio of a number of times trace collection occurs, compared to a number of receptions of request telegraphic messages when trace collection is indicated by the switch information, and embedding the trace collection condition in the relay code in accordance with the ratio of the intermittent switch information;
   wherein the analysis display step includes extracting trace information of a route in accordance with a relay ID(Identification Data) from trace information collected for each application in the trace collection step, sorting the information in order of time and generating for display a route and relationship between each application and processes based on the result of sorting,
   wherein the analysis display step includes displaying a processing time from reception of the request telegraphic message to transfer to the next application in such a manner as to correspond to each application;
   wherein the trace condition embedding step further includes using as the trace collection conditions a function ID(Identification Data) that indicates a range of trace collection for each application, and the relay ID(Identification Data), which records applications that have passed through.

2. The trace processing method of claim 1, wherein the trace condition embedding step includes generating a unique relay ID(Identification Data) when trace collection is indicated by the switch information, and wherein the trace collection step includes adding an identifier of a next invoked application behind the relay ID.

3. The trace processing method of claim 1, wherein the intermittent switch information identifies a route of the request telegraphic message and indicates a ratio of trace collection to reception times of the request telegraphic message for each identified route.

4. The trace processing method of claim 1, wherein the intermittent switch indicates a ratio of trace collection to reception times of the request telegraphic message in a range of zero (0) percent to 100 percent.

5. The trace processing method of claim 1, wherein the analysis display step includes displaying a ratio of a processing time for each application from reception of the request telegraphic message to transfer to the next application to a total processing time from reception of the request telegraphic message at an entry application to response in such a manner as to correspond to each application.

6. A trace processing system for distributed applications that have a plurality of application processing units running on a plurality of servers arranged hierarchically and that, when a request telegraphic message is received from a client, executes processes for response while transferring a relay code between application processing units in order, the trace processing system comprising a controller which includes:
   a trace condition embedding unit provided to said servers receiving the request telegraphic message from said client, that when the request telegraphic message is received, embeds preset trace collection conditions including switch information that indicates whether trace collection is to be made or not in the relay code, for transfer to a next application processing unit;
   a trace collection unit that is provided in each of the application processing units provided in said plural servers and that, when the request telegraphic message is received, decides for processing whether trace collection is to be made or not based on the switch information of the trace collection conditions embedded in the relay code; and
   an analysis display unit that collects for analysis and display traces which have been collected by the application processing units,
   wherein the trace condition embedding unit uses as the trace collection conditions intermittent switch information that indicates a ratio of a number of times trace collection occurs, compared to a number of receptions of request telegraphic messages when trace collection is indicated by the switch information, the trace condition embedding unit embedding the trace collection conditions in the relay code in accordance with the ratio of the intermittent switch information;
   wherein the analysis display unit extracts trace information of a route in accordance with the relay ID (Identification Data) from trace information collected for each application by the trace collection unit, sorts the information in order of time and generates for display the route and relationship between applications and processes based on the result of sorting, wherein the analysis display unit displays a processing time from reception of the request telegraphic message to transfer to the next application such that the time corresponds to each application;

wherein the trace condition embedding unit uses as the trace collection conditions a function ID (Identification Data) that indicates a range of trace collection for each application, and the relay ID (Identification Data), which records applications that have passed through.

7. The trace processing system of claim 6, wherein the trace condition embedding unit generates a unique relay ID (Identification Data) when trace collection is indicated by the switch information, and wherein the trace collection unit adds an identifier of a next invoked application behind the relay ID.

8. The trace processing system of claim 6, wherein the intermittent switch information identifies a route of the request telegraphic message and indicates a ratio of trace collection to reception times of the request telegraphic message for each identified route.

9. The trace processing system of claim 6, wherein the intermittent switch information indicates a ratio of trace collection to reception times of the request telegraphic message in a range of zero (0) percent to 100 percent.

* * * * *